US012756282B2

(12) United States Patent
Ogura et al.

(10) Patent No.: US 12,756,282 B2
(45) Date of Patent: Oct. 6, 2026

(54) INSTALLATION METHOD FOR ROTATING ELECTRICAL MACHINE AND INSTALLATION STRUCTURE FOR ROTATING ELECTRICAL MACHINE

(71) Applicant: MITSUBISHI GENERATOR CO., LTD., Kobe City (JP)

(72) Inventors: Yu Ogura, Tokyo (JP); Seijiro Muramatsu, Tokyo (JP); Chuanhong Fan, Tokyo (JP)

(73) Assignee: Mitsubishi Generator Co., Ltd., Kobe City (JP)

( * ) Notice: Subject to any disclaimer, the term of this patent is extended or adjusted under 35 U.S.C. 154(b) by 737 days.

(21) Appl. No.: 18/119,532

(22) Filed: Mar. 9, 2023

(65) Prior Publication Data

US 2023/0318419 A1 Oct. 5, 2023

(30) Foreign Application Priority Data

Mar. 30, 2022 (JP) ................................ 2022-055330

(51) Int. Cl.
*H02K 15/14* (2025.01)

(52) U.S. Cl.
CPC .................................... *H02K 15/14* (2013.01)

(58) Field of Classification Search
CPC ....... H02K 15/14; H02K 2213/03; H02K 5/26
USPC .................................................... 29/596, 732
See application file for complete search history.

(56) References Cited

U.S. PATENT DOCUMENTS 11,677,280 B2 * 6/2023 Takahashi ................ H02K 3/28 310/71
2019/0089227 A1 * 3/2019 Muramatsu ............ H02K 5/207
2023/0318419 A1 * 10/2023 Ogura ....................... H02K 5/26 29/732

FOREIGN PATENT DOCUMENTS

CN 103978344 A * 8/2014 .............. B23P 15/00
JP 7-107694 A 4/1995
JP 2006-6009 A 1/2006

OTHER PUBLICATIONS

Office Action dated Aug. 5, 2024, issued in the corresponding Canadian Patent Application No. 3,192,811, 7 pages.
Notice of Reasons for Refusal dated Sep. 16, 2025, issued in the corresponding Japanese Patent Application No. 2024-512435, 8 pages including 4 pages of English Translation.

* cited by examiner

*Primary Examiner* — Minh N Trinh
(74) *Attorney, Agent, or Firm* — Buchanan Ingersoll & Rooney PC

(57) ABSTRACT

An installation method for a rotating electrical machine includes a placement step of placing a leg portion, which has a first surface formed with a first groove portion, on a support member, which has a second surface formed with a second groove portion, a length adjustment step of shortening at least either of a pair of projecting portions of a key member, which includes a narrow portion and a wide portion with a pair of projecting portions projecting to both sides in a width direction from the narrow portion, to be fitted into a wide groove portion having a larger groove width of the first groove portion or the second groove portion, after the placement step, and a fitting step of fitting the key member into a key groove formed by the first groove portion and the second groove portion, after the length adjustment step.

6 Claims, 10 Drawing Sheets

1

2

INSTALLATION METHOD FOR ROTATING ELECTRICAL MACHINE AND INSTALLATION STRUCTURE FOR ROTATING ELECTRICAL MACHINE

TECHNICAL FIELD

The present disclosure relates to an installation method for a rotating electrical machine and an installation structure for the rotating electrical machine.

This application claims the priority of Japanese Patent Application No. 2022-055330 filed on Mar. 30, 2022, the content of which is incorporated herein by reference.

BACKGROUND

A rotating electrical machine is generally composed of a stator and a rotor. The stator includes a stator core and a stator coil. The stator coil is incorporated into and fixed to a slot disposed in the stator core. The rotating electrical machine is configured to generate an electromagnetic force by rotating the rotor having an N pole and an S pole in the stator coil.

The rotating electrical machine may thermally be elongated along the axial direction of the rotor due to an influence of heat generated during operation of the rotating electrical machine. Therefore, a thrust key (key member) is fitted into a key groove in order to suppress the thermal elongation along the axial direction of the rotor.

Patent Document 1 discloses a key fastening structure that includes a key groove disposed in a stator base of a rotating electrical machine, and a stator base key inserted into the key groove to connect a stator frame and the stator base. Patent Document 2 discloses a key fastening structure that includes key grooves disposed in a base and a stator of a rotating electrical machine, a set key to be fitted with the key groove disposed in the base, and a side key for fixing the set key and the key groove disposed in the stator.

CITATION LIST

Patent Literature

Patent Document 1: JP2006-6009A
Patent Document 2: JPH07-107694A

SUMMARY

Meanwhile, when a leg portion of a rotating electrical machine and a base for supporting the leg portion are fixed by key fastening, if misalignment occurs between a groove portion formed in the leg portion and a groove portion formed in the base, it may be difficult to fit a thrust key (key member) into these groove portions. If the misalignment thus occurs during installation work for the rotating electrical machine, workability of the installation work may decrease.

In view of the above, an object of at least one embodiment of the present invention is to provide an installation method and an installation structure for the rotating electrical machine that can improve the workability of the installation work for the rotating electrical machine in case the misalignment occurs during the installation work.

An installation method for a rotating electrical machine according to at least one embodiment of the present invention is an installation method for a rotating electrical machine that includes a rotor, a stator disposed so as to surround the rotor, and a casing configured to house the rotor and the stator, including: a placement step of placing a leg portion, which is disposed in the casing and has a first surface formed with a first groove portion extending along a first direction intersecting an axial direction of the rotor, on a support member, which has a second surface formed with a second groove portion extending along the first direction, the placement step including placing the leg portion on the support member such that a narrow groove portion having a smaller groove width of the first groove portion or the second groove portion falls within a range in a width direction of a wide groove portion having a larger groove width of the first groove portion or the second groove portion; a preparation step of preparing a key member which includes a narrow portion to be fitted into the narrow groove portion, and a wide portion having a one-side projecting portion projecting to one side in the width direction from the narrow portion and an another-side projecting portion projecting to another side in the width direction from the narrow portion; a length adjustment step of shortening at least either of the one-side projecting portion or the another-side projecting portion of the key member to be fitted into the wide groove portion, after the placement step; and a fitting step of fitting the key member into a key groove formed by the first groove portion and the second groove portion, after the length adjustment step.

An installation structure for a rotating electrical machine according to at least one embodiment of the present invention is an installation structure for a rotating electrical machine that includes a rotor; a stator disposed so as to surround the rotor, and a casing configured to house the rotor and the stator, including: a leg portion which is disposed in the casing and has a first surface formed with a first groove portion extending along a first direction intersecting an axial direction of the rotor; a support member which has a second surface formed with a second groove portion extending along the first direction, the support member including the leg portion placed thereon such that a narrow groove portion having a smaller groove width of the first groove portion or the second groove portion falls within a range in a width direction of a wide groove portion having a larger groove width of the first groove portion or the second groove portion; and a key member which includes a narrow portion fitted into the narrow groove portion and a wide portion fitted into the wide groove portion. The wide portion of the key member has a one-side projecting portion projecting to one side in the width direction from the narrow portion and an another-side projecting portion projecting to another side in the width direction from the narrow portion. At least either of the one-side projecting portion or the another-side projecting portion has a cut mark on a distal end face.

According to at least one embodiment of the present invention, provided are an installation method and an installation structure for a rotating electrical machine that can improve the workability of installation work for the rotating electrical machine in case misalignment occurs during the installation work.

DETAILED DESCRIPTION

Figure 1:
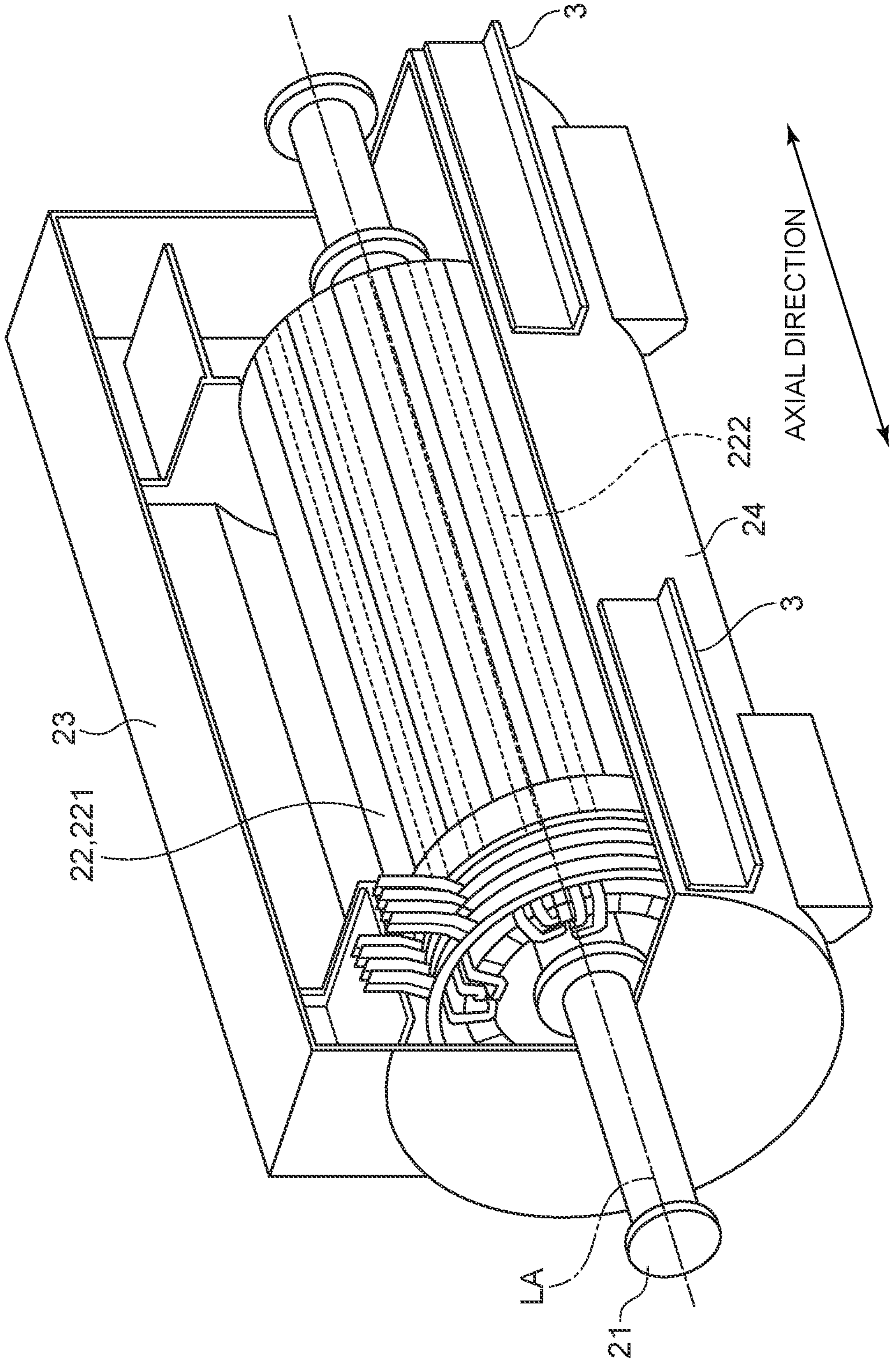
FIG. 1 is a schematic perspective view of a partially cut rotating electrical machine in an embodiment.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

(Rotating Electrical Machine)

FIG. 1 is a schematic perspective view of a partially cut rotating electrical machine 2 in an embodiment. As shown in FIG. 1, the rotating electrical machine 2 in some embodiments includes a rotor 21, a stator 22 disposed so as to surround the rotor 21, and a casing 23 configured to house the rotor 21 and the stator 22. In some embodiments below, a case where the rotating electrical machine 2 is constituted by an electric motor is described. However, the present disclosure is also applicable to a case where the rotating electrical machine 2 is constituted by a generator.

The stator 22 includes a stator core 221 and a stator coil 222. The stator coil 222 is mounted on an inner circumferential surface of the stator core 221 formed annularly by laminating electromagnetic steel sheets, is disposed so as to cover an outer side in the radial direction of the rotor 21 (a direction orthogonal to an axis LA of the rotor 21), and forms a gap with the rotor 21. The rotating electrical machine (electric motor) 2 is configured to generate an electromagnetic force by rotating the rotor 21 having an N pole and an S pole in the stator coil 222. In the following description, a direction may be described with reference to the axial direction of the rotor 21 (a direction in which the axis LA of the rotor 21 extends) as shown in FIG. 1.

(Installation Structure for Rotating Electrical Machine)

Figure 2:
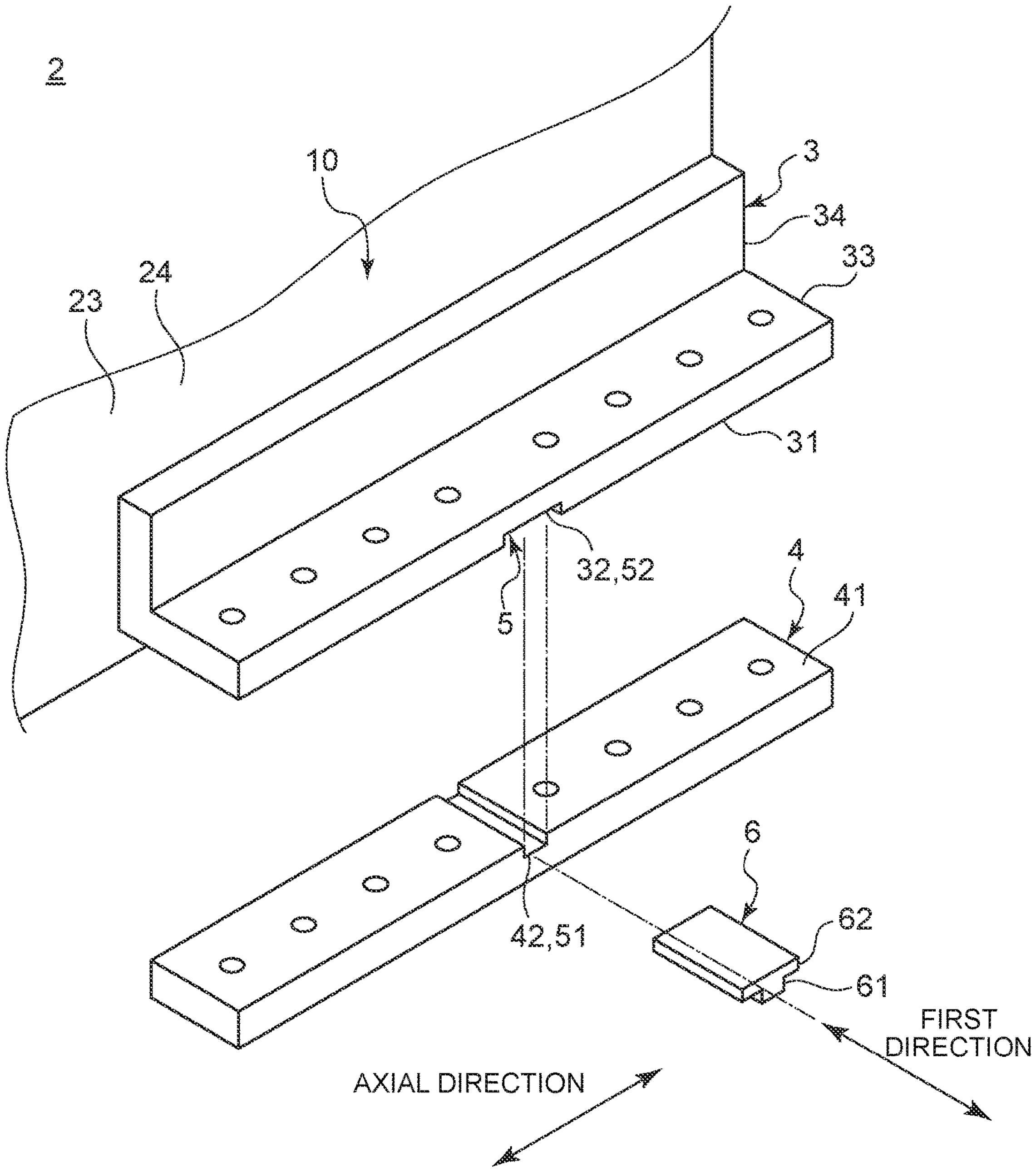
FIG. 2 is a schematic exploded view of an installation structure for the rotating electrical machine according to an embodiment.
Figure 3:
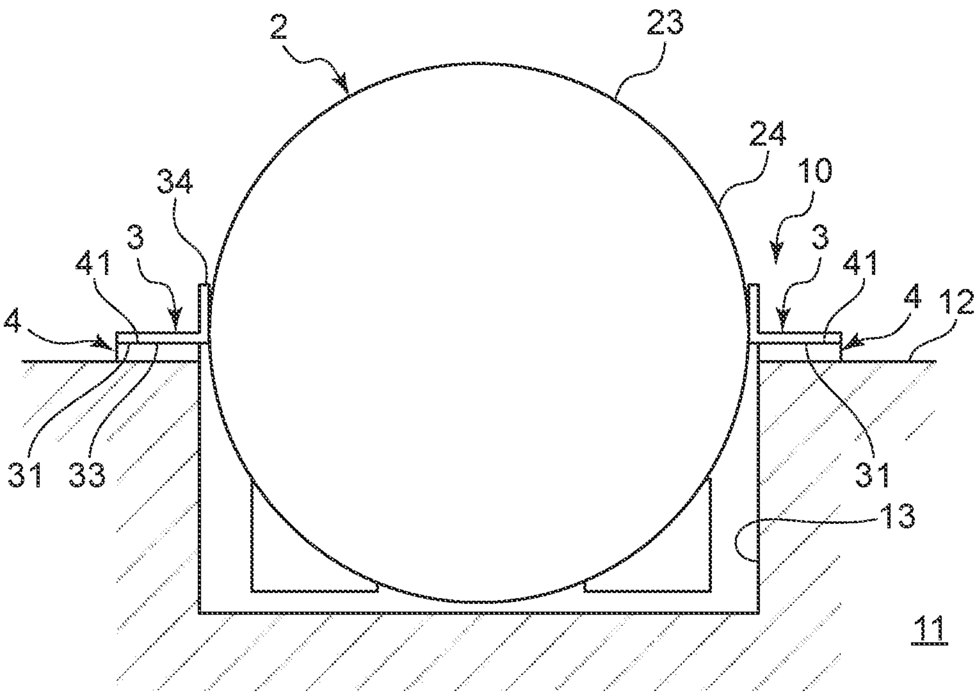
FIG. 3 is a schematic view showing a state viewed from one side of the axial direction of the rotating electrical machine in an embodiment.

FIG. 2 is a schematic exploded view of an installation structure 10 for the rotating electrical machine 2 according to an embodiment. FIG. 3 is a schematic view showing a state viewed from one side of the axial direction of the rotating electrical machine 2 (the axial direction of the rotor 21) in an embodiment. As shown in FIG. 2, the installation structure 10 for the rotating electrical machine 2 according to some embodiments includes a leg portion 3 which is disposed in the casing 23 and has a first surface 31 formed with a first groove portion 32, a support member (such as a sole plate) 4 which has a second surface 41 formed with a second groove portion 42 and on which the leg portion 3 is placed, and a key member 6 which is fitted into a key groove 5 formed by the first groove portion 32 and the second groove portion 42 arranged to face each other. The installation structure 10 is a combination of the leg portion 3, the support member 4, and the key member 6.

Each of the first groove portion 32 and the second groove portion 42 extends along a first direction intersecting the axial direction of the rotor 21, and both ends in the extension direction (first direction) are open. In the illustrated embodiment, the first direction extends along a direction orthogonal to each of the vertical direction and the axial direction and of the rotor 21. Herein, the axial direction of the rotor 21 extends along one direction in the horizontal direction.

(Leg Portion)

In the embodiment shown in FIG. 2, FIG. 3, the leg portion 3 has a longitudinal direction along the axial direction of the rotor 21, and is constituted by an angle having an L-shaped cross section orthogonal to the longitudinal direction. The leg portion 3 includes a flat plate-like first plate portion 33 having the above-described first surface 31 as a lower surface and having a longitudinal direction along the axial direction of the rotor 21, and a flat plate-shaped second plate portion 34 projecting upward from one end portion of the first plate portion 33 in a width direction along the vertical direction and having a longitudinal direction along the axial direction of the rotor 21.

In the embodiment shown in FIG. 2, FIG. 3, the casing 23 includes a casing body 24 for covering a part in the circumferential direction of the rotor 21 and the stator 22, and having an arc-shaped cross section orthogonal to the axial direction of the rotor 21. Each of the leg portion 3 and the casing body 24 is made of a metal material. The second plate portion 34 is fixed to the casing body 24 by welding or the like in a state where an outer surface connected to the first surface 31 is in contact with an outer circumferential surface of the casing body 24.

(Support Member)

In the embodiment shown in FIG. 2, FIG. 3, the support member 4 is made of a flat plate having the above-described second surface 41 as an upper surface and having a longitudinal direction along the axial direction of the rotor 21. The support member 4 is made of a metal material. In the illustrated embodiment, as shown in FIG. 3, the support member 4 is placed on a floor surface 12 of an installation location 11 where the rotating electrical machine 2 is installed, and is fixed to the floor surface 12 (installation location 11). As shown in FIG. 3, a recess 13 recessed below the floor surface 12 may be formed in the installation location 11, and the casing body 24 may be inserted into the recess 13.

(Installation Structure for Rotating Electrical Machine According to Comparative Example)

Figure 4:
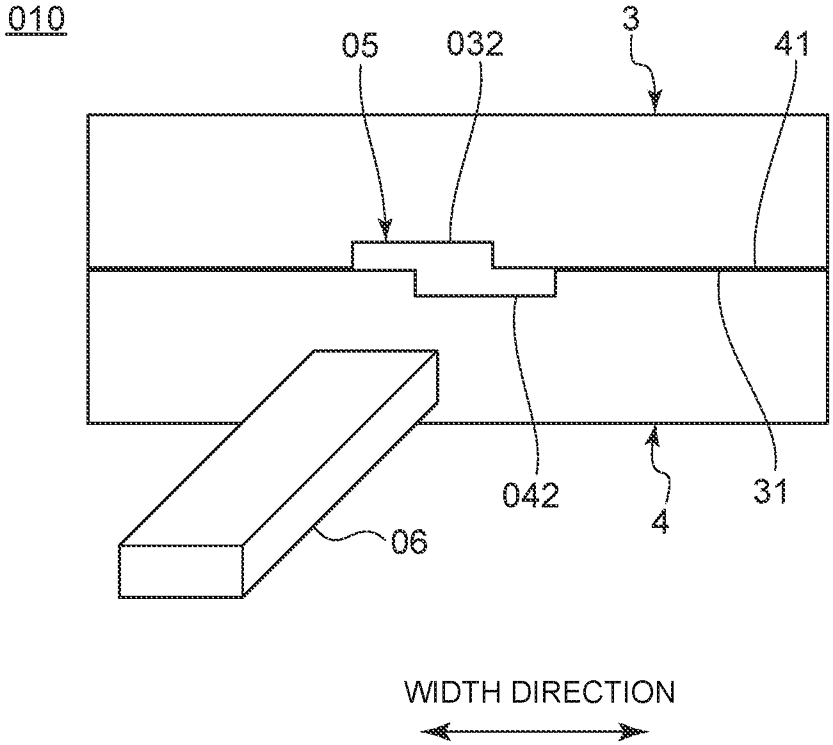
FIG. 4 is an explanatory view for describing the installation structure for the rotating electrical machine according to a comparative example.

FIG. 4 is an explanatory view for describing an installation structure 010 for the rotating electrical machine 2 according to a comparative example. In the installation structure 010 for the rotating electrical machine 2 according to the comparative example, the same reference signs are given to the parts common to the installation structure 10 for the rotating electrical machine 2, and redundant description will be omitted as appropriate.

As shown in FIG. 4, the installation structure 010 for the rotating electrical machine 2 according to the comparative example includes the leg portion 3 which has the first surface 31 formed with a first groove portion 032, the support member 4 which has the second surface 41 formed with a second groove portion 042 and on which the leg portion 3 is placed such that the first surface 31 abuts on the second surface 41, and a key member 06 which is fitted into a key groove 05 formed by the first groove portion 032 and the second groove portion 042 arranged to face each other.

A groove width of the second groove portion 042 has the same length as a groove width of the first groove portion 032, and the key member 06 has a rectangular cross section orthogonal to the first direction which is the direction in which the key member 06 is inserted into the key groove 05. In this case, if the first groove portion 032 is displaced from the second groove portion 042 in the width direction of the second groove portion 042 when the leg portion 3 is placed on the support member 4, the key groove 05 formed by the first groove portion 032 and the second groove portion 042 is no longer rectangular, making it difficult to fit the key member 06 into the key groove 05.

If the installation structure 010 is newly set and the support member 4 is not fixed to the floor surface 12 of the installation location 11 which is a foundation, it is possible to align positions of the first groove portion 032 and the second groove portion 042 in the width direction by aligning a position of the support member 4 with the leg portion 3. However, if the rotating electrical machine 2 is installed on the existing support member 4, since the support member 4 is fixed to the floor surface 12 of the installation location 11 which is the foundation, the position of the support member 4 cannot be aligned with the leg portion 3. Further, if the rotating electrical machine 2 is installed on the existing support member 4, actual measurement of a groove dimension (a groove width, etc.) of the first groove portion 032 or the second groove portion 042, the position of the support member 4 may be required in the installation site of the rotating electrical machine 2. Due to an error in the actual measurement, it is likely that the first groove portion 032 is displaced from the second groove portion 042 in the width direction of the second groove portion 042 when the rotating electrical machine 2 is installed.

(Installation Method for Rotating Electrical Machine)

Figure 5:
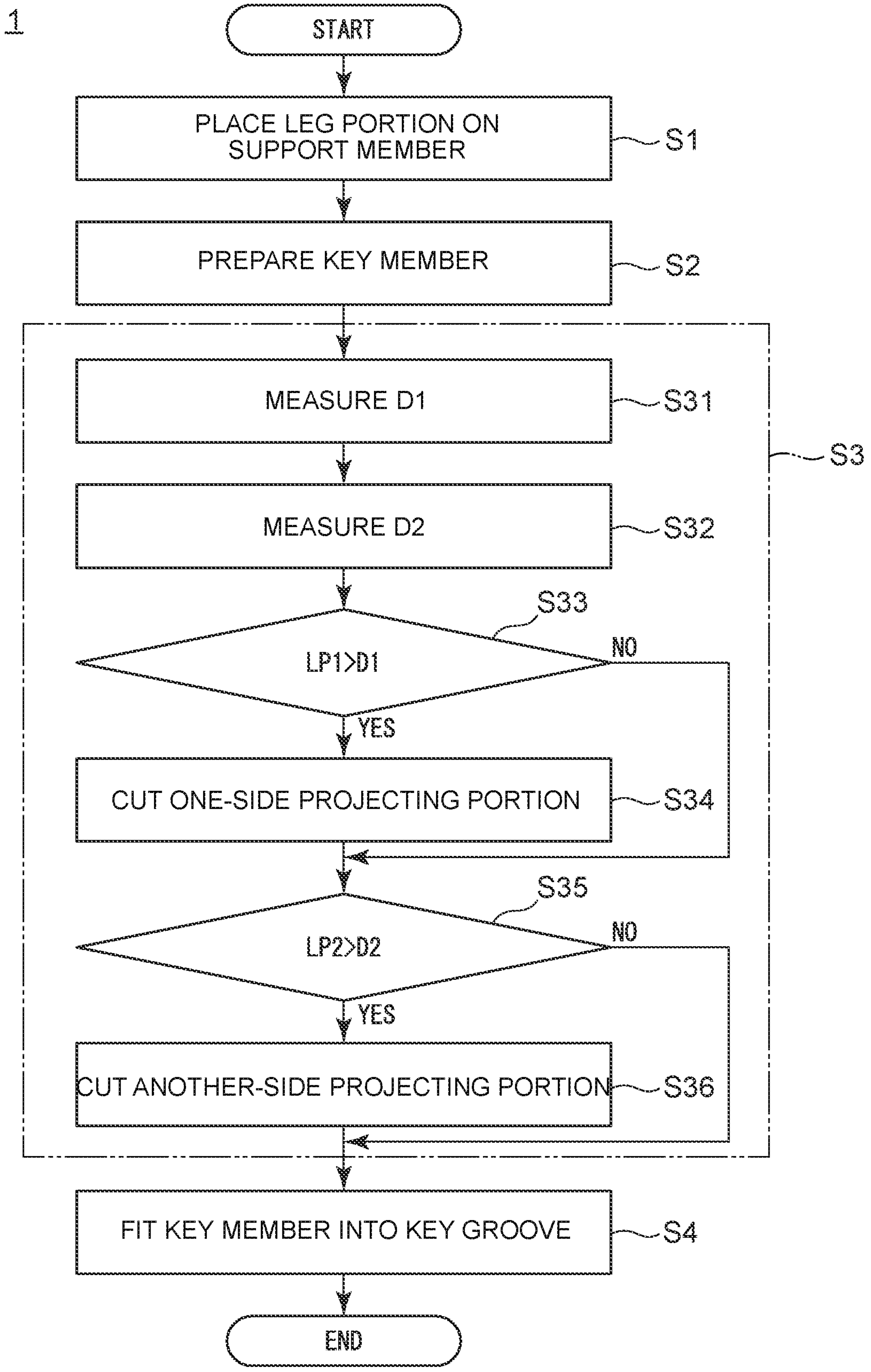
FIG. 5 is a flowchart of an installation method for the rotating electrical machine according to an embodiment.

FIG. 5 is a flowchart of an installation method 1 for the rotating electrical machine 2 according to an embodiment. In the installation method 1 for the rotating electrical machine 2 according to some embodiments, the above-described installation structure 10 is formed by combining the leg portion 3, the support member 4, and the key member 6. As shown in FIG. 5, the installation method 1 for the rotating electrical machine 2 includes a placement step S1, a preparation step S2, a length adjustment step S3, and a fitting step S4.

(Placement Step)

Figure 6:
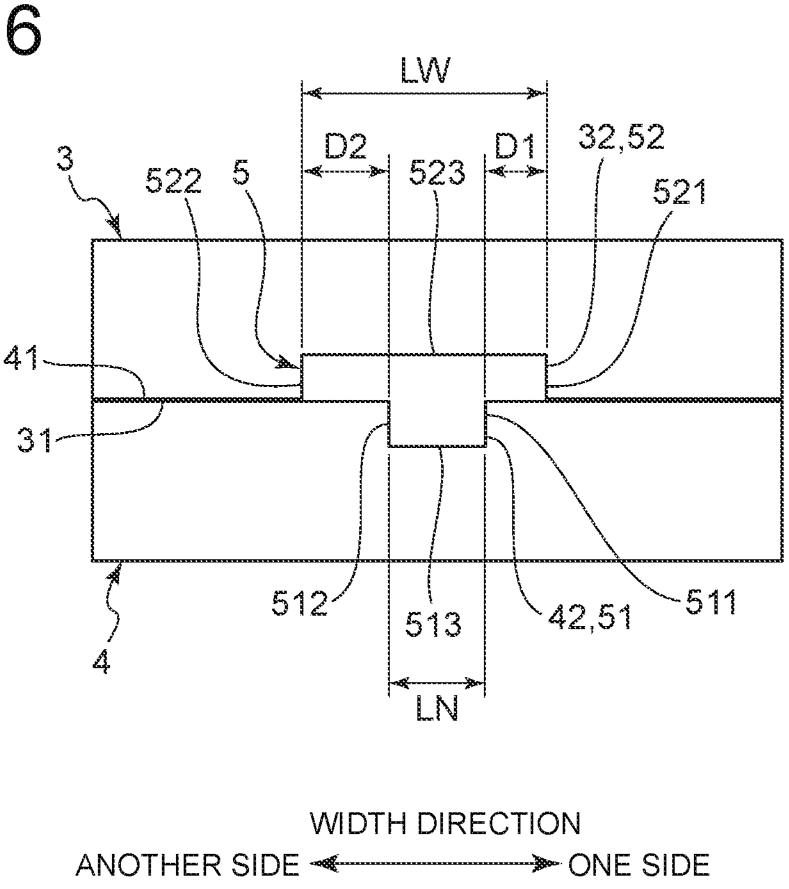
FIG. 6 is a schematic view of a leg portion and a support member of the installation structure for the rotating electrical machine according to an embodiment.

FIG. 6 is a schematic view of the leg portion 3 and the support member 4 of the installation structure 10 for the rotating electrical machine 2 according to an embodiment. The placement step S1 includes placing the leg portion 3 on the support member 4, as shown in FIG. 6. The placement step S1 includes bringing the first surface (lower surface) 31 of the leg portion 3 into contact with the second surface (upper surface) 41 of the support member 4 so that the first groove portion 32 and the second groove portion 42 face each other. The key groove 5 for inserting the key member 6 is formed by causing the first groove portion 32 and the second groove portion 42 to face each other.

As shown in FIG. 2, FIG. 6, the first groove portion 32 is different from the second groove portion 42 in groove width (length in the width direction). In the illustrated embodiment, the width direction of the first groove portion 32 or the second groove portion 42 is the direction along the axial direction of the rotor 21. Hereinafter, a groove portion having a smaller groove width of the first groove portion 32 or the second groove portion 42 is defined as a narrow groove portion 51, and a groove portion having a larger groove width of the first groove portion 32 or the second groove portion 42 is defined as a wide groove portion 52. In the embodiment shown in FIG. 2, FIG. 6, the first groove portion 32 has the larger groove width than the second groove portion 42. That is, the first groove portion 32 is the wide groove portion 52, and the second groove portion 42 is the narrow groove portion 51.

The narrow groove portion 51 has an end face 511 on one side in the width direction of the narrow groove portion 51, an end face 512 on another side in the width direction of the narrow groove portion 51, and a groove bottom face 513 connecting the end face 511 on the one side and the end face 512 on the another side. Each of the end face 511 on the one side and the end face 512 on the another side extends from a surface, on which the narrow groove portion 51 is formed, along a depth direction (vertical direction) of the narrow groove portion 51.

The wide groove portion 52 has an end face 521 on the above-described one side in the width direction of the wide groove portion 52, an end face 522 on the above-described another side in the width direction of the wide groove portion 52, and a groove bottom face 523 connecting the end face 521 on the one side and the end face 522 on the another side. Each of the end face 521 on the one side and the end face 522 on the another side extends from a surface, on which the wide groove portion 52 is formed, along a depth direction (vertical direction) of the wide groove portion 52.

The placement step S1 includes placing the leg portion 3 on the support member 4 such that the narrow groove portion 51 falls within a range in the width direction of the wide groove portion 52. The range in the width direction of the wide groove portion 52 is a range from the end face 511 on the one side to the end face 512 on the another side in the width direction, and the end face 521 on the one side and the end face 522 on the another side of the wide groove portion 52 are located within this range.

(Preparation Step)

Figure 7:
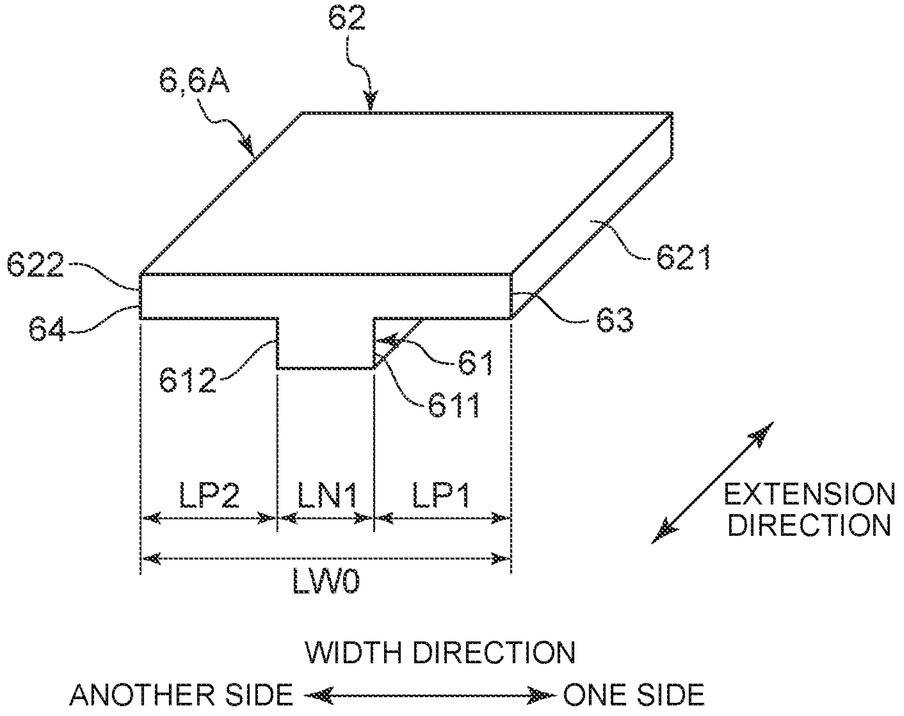
FIG. 7 is a schematic perspective view of a key member prepared in a preparation step of the installation method for the rotating electrical machine according to an embodiment.

FIG. 7 is a schematic perspective view of the key member 6 (6A) prepared in the preparation step S2 of the installation method 1 for the rotating electrical machine 2 according to an embodiment. The preparation step S2 includes preparing the key member 6, as shown in FIG. 7. The key member 6 includes a narrow portion 61 to be fitted into the narrow groove portion 51, and a wide portion 62 which has a one-side projecting portion 63 projecting to the one side in the width direction from the narrow portion 61 and an another-side projecting portion 64 projecting to the another side in the width direction from the narrow portion 61. Each of the narrow portion 61 and the wide portion 62 has a rectangular cross section orthogonal to the extension direction (longitudinal direction) of the key member 6. The key member 6 is made of a metal material, and the narrow portion 61 and the wide portion 62 are integrally formed.

The narrow portion 61 has an end face 611 on the one side in the width direction of the narrow portion 61 and an end face 612 on the another side in the width direction of the narrow portion 61. The wide portion 62 includes an end face 621 on the one side in the width direction of the wide portion 62, the end face 621 being disposed on the above-described one side in the width direction relative to the end face 611 of the narrow portion 61, and an end face 622 on the another side in the width direction of the wide portion 62, the end face 622 being disposed on the above-described another side in the width direction relative to the end face 612 of the narrow portion 61. The preparation step S2 may be performed before the placement step S1 or may be performed after the placement step S1.

As shown in FIG. 6, a length of the narrow groove portion 51 in the width direction is defined as LN, and a length of the wide groove portion 52 in the width direction is defined as LW. Further, a distance (distance in the width direction) from the end face 521 on the one side in the width direction of the wide groove portion 52 to the end face 511 on the one side in the width direction of the narrow groove portion 51 in the key groove 5 is defined as D1, and a distance (distance in the width direction) from the end face 522 on the another side in the width direction of the wide groove portion 52 to the end face 512 on the another side in the width direction of the narrow groove portion 51 in the key groove 5 is defined as D2.

As shown in FIG. 7, the key member 6 prepared in the preparation step S2 is used as the reference key member 6A. A length of the narrow portion 61 of the reference key member 6A in the width direction is defined as LN1, and a length of the wide portion 62 of the reference key member 6A in the width direction is defined as LW0. Further, a length of the one-side projecting portion 63 in the reference key member 6A in the width direction, that is, a distance (distance in the width direction) from the end face 611 on the one side in the width direction of the narrow portion 61 to the end face 621 on the one side in the width direction of the wide portion 62 is defined as LP1, and a length of the another-side projecting portion 64 in the reference key member 6A in the width direction, that is, a distance (distance in the width direction) from the end face 612 on the another side in the width direction of the narrow portion 61 to the end face 622 on the another side in the width direction of the wide portion 62 is defined as LP2.

The length LN1 of the narrow portion 61 of the reference key member 6A in the width direction is equal to the length LN of the narrow groove portion 51 in the width direction or shorter than the above-described length LN. The length LW0 of the wide portion 62 of the reference key member 6A in the width direction is longer than the length LW of the wide groove portion 52 in the width direction.

(Length Adjustment Step)

Figure 8:
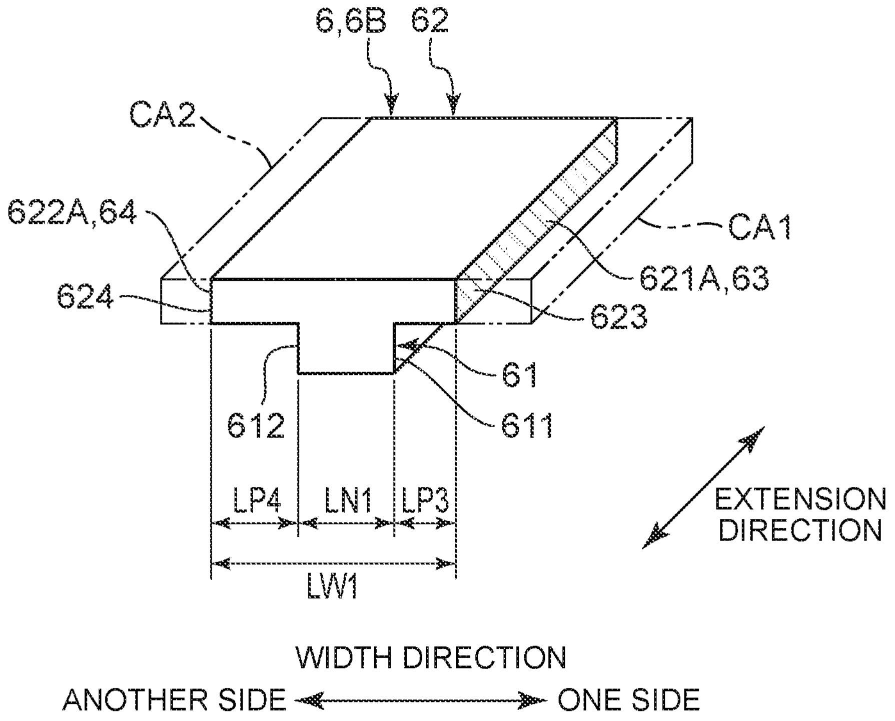
FIG. 8 is a schematic perspective view of the key member after a length adjustment step of the installation method for the rotating electrical machine according to an embodiment.
Figure 9:
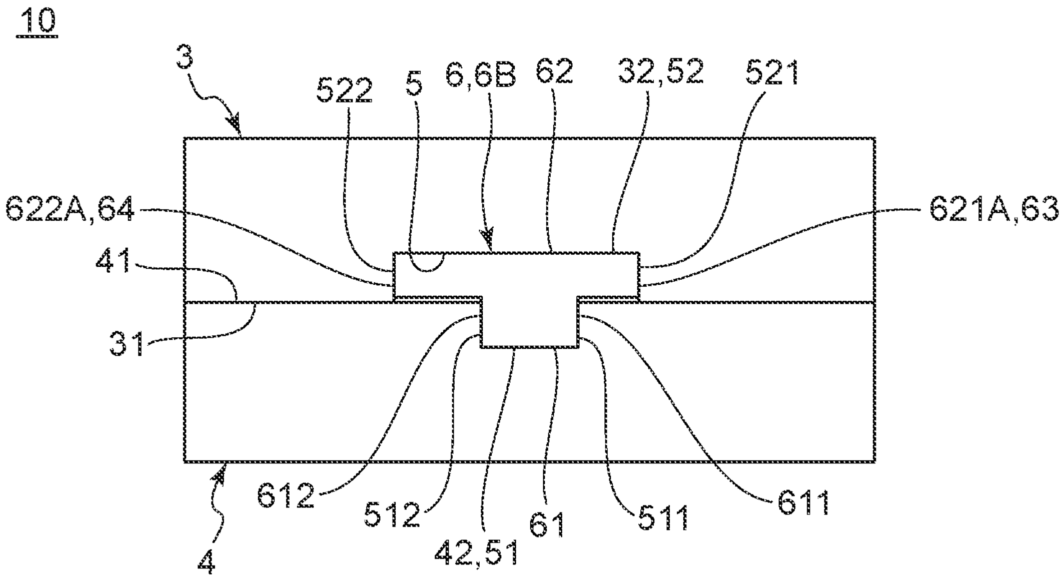
FIG. 9 is a schematic view of the installation structure for the rotating electrical machine according to an embodiment.

FIG. 8 is a schematic perspective view of the key member 6 (6B) after the length adjustment step S3 of the installation method 1 for the rotating electrical machine 2 according to an embodiment. FIG. 9 is a schematic view of the installation structure 10 for the rotating electrical machine 2 according to an embodiment. The length adjustment step S3 includes shortening at least either of the one-side projecting portion 63 or the another-side projecting portion 64 of the key member 6 (6A) to be fitted into the wide groove portion 52. The key member 6 after the length adjustment step S3 is referred to as the adjusted key member 6B.

As shown in FIG. 8, a length of the wide portion 62 of the adjusted key member 6B in the width direction is defined as LW1. A length of the one-side projecting portion 63 in the adjusted key member 6B in the width direction, that is, a distance (distance in the width direction) from the end face 611 on the one side in the width direction of the narrow portion 61 to an end face 621A on the one side in the width direction of the wide portion 62 is defined as LP3, and a length of the another-side projecting portion 64 in the adjusted key member 6B in the width direction, that is, a distance (distance in the width direction) from the end face 612 on the another side in the width direction of the narrow portion 61 to an end face 622A on the another side in the width direction of the wide portion 62 is defined as LP4. The length LW1 of the wide portion 62 of the adjusted key member 6B in the width direction is equal to the length LW of the wide groove portion 52 in the width direction or shorter than the above-described length LW. In the adjusted key member 6B, either of the one-side projecting portion 63 or the another-side projecting portion 64 may be cut and removed in the length adjustment step S3.

(Fitting Step)

The fitting step S4 includes, after the length adjustment step S3, fitting the key member 6 (6B, see FIG. 8) into the key groove 5 formed by the first groove portion 32 and the second groove portion 42, as shown in FIG. 9. The narrow portion 61 of the adjusted key member 6B is fitted into the narrow groove portion 51 of the key groove 5, and the wide portion 62 of the adjusted key member 6B is fitted into the wide groove portion 52 of the key groove 5.

According to the installation method 1 for the rotating electrical machine 2 described above, when the leg portion 3 is placed on the support member 4, the relative position of the wide groove portion 52 to the narrow groove portion 51 may shift in the width direction of the wide groove portion 52. The length of at least either of the one-side projecting portion 63 or the another-side projecting portion 64 of the key member 6 is shortened according to the relative position of the wide groove portion 52 to the narrow groove portion 51 after the leg portion 3 is placed on the support member 4, allowing the wide portion 62 of the key member 6 to be fitted into the wide groove portion 52. With the above method, the key member 6 can be fitted into the key groove 5, as long as the misalignment between the wide groove portion 52 and the narrow groove portion 51 can be addressed in the length adjustment step S3. Thus, with the above method, it is possible to improve the workability of the installation work in case the misalignment occurs during the installation work for the rotating electrical machine 2.

Further, with the above method, since the length of the one-side projecting portion 63 or the another-side projecting portion 64 is adjusted in the length adjustment step S3, it is possible to reduce a gap between the wide groove portion 52 and the wide portion 62. By reducing the gap between the wide groove portion 52 and the wide portion 62, it is possible to suppress from an early stage that the key member 6 fitted into the key groove 5 is thermally elongated due to an influence of heat during operation of the rotating electrical machine 2.

The length LW1 of the wide portion 62 preferably satisfies a condition of $0.95 \times LW \leq LW1 \leq LW$, where the length of the wide groove portion 52 in the width direction described above is defined as LW (see FIG. 6) and the length of the wide portion 62 in the width direction after the length adjustment step S3 is defined as LW1 (see FIG. 8). If the length LW1 of the wide portion 62 satisfies the above-described condition, the gap between the wide groove portion 52 and the wide portion 62 when the wide portion 62 is fitted in the wide groove portion 52 becomes small. Thus, it is possible to suppress from the early stage that the key member 6 (6B) fitted into the key groove 5 is thermally elongated due to the influence of heat during operation of the rotating electrical machine 2.

The length LN1 of the narrow portion 61 preferably satisfies a condition of $0.95 \times LN \leq LN1 \leq LN$, where the length of the narrow groove portion 51 in the width direction described above is defined as LN (see FIG. 6) and the length of the narrow portion 61 of the key member 6 (6A) in the width direction prepared in the preparation step S2 is defined as LN1. If the length LN1 of the narrow portion 61 satisfies the above-described condition, the narrow portion 61 can be fitted in the narrow groove portion 51 without additional work on the key groove 5 or the key member 6 after the preparation step S2. Further, if the length LN1 of the narrow portion 61 satisfies the above-described condition, a gap between the narrow groove portion 51 and the narrow portion 61 when the narrow portion 61 is fitted in the narrow groove portion 51 becomes small. Thus, it is possible to suppress from the early stage that the key member 6 fitted into the key groove 5 is thermally elongated due to the influence of heat during operation of the rotating electrical machine 2.

In some embodiments, as shown in FIG. 5, the above-described length adjustment step S3 includes a first measurement step S31 of measuring the above-described distance D1 (see FIG. 6), a second measurement step S32 of measuring the above-described distance D2 (see FIG. 6), and cutting step S34, S36 of cutting at least either of the one-side projecting portion 63 or the another-side projecting portion 64 of the key member 6 to be shortened according to measurement results of the first measurement step S31 and the second measurement step S32.

The first measurement step S31 includes measuring the distance D1 from the end face 521 on the one side in the width direction of the wide groove portion 52 to the end face 511 on the one side in the width direction of the narrow groove portion 51 in the key groove 5. If the distance (distance in the width direction) LP1 from the end face 611 on the one side in the width direction of the narrow portion 61 to the end face 621 on the one side in the width direction of the wide portion 62 of the reference key member 6A is unknown, the distance LP1 may be measured in the length adjustment step S3.

If the distance LP1 is greater than the distance D1 ("YES" in step S33), the one-side projecting portion 63 is cut to be shortened (cutting step S34). As shown in FIG. 8, since the one-side projecting portion 63 has its distal end portion (area to be cut CA1) removed by the cutting process in the cutting step S34, the length (distance LP3) of the one-side projecting portion 63 in the width direction after the cutting process is shorter than the length (distance LP1) in the width direction before the cutting process. The above-described distance LP3 is the distance (distance in the width direction) from the end face 611 on the one side in the width direction of the narrow portion 61 to the end face (a distal end face after the cutting process) 621A on the one side in the width direction of the wide portion 62. The distal end face 621A after the cutting process has a cut mark 623 caused by the cutting process in the cutting step S34.

The cutting step S34 may include adjusting a section (area to be cut CA1) to be cut and removed from the one-side projecting portion 63 so that the above-described distance LP3 satisfies a condition of $0.95 \times D1 \leq LP3 \leq D1$. If the distance LP1 is equal to the distance D1 or less than the distance D1 ("NO" in step S33), the length of the one-side projecting portion 63 need not be adjusted.

The second measurement step S32 includes measuring the distance D2 from the end face 522 on the another side in the width direction of the wide groove portion 52 to the end face 512 on the another side in the width direction of the narrow groove portion 51 in the key groove 5. If the distance (distance in the width direction) LP2 from the end face 612 on the another side in the width direction of the narrow portion 61 to the end face 622 on the another side in the width direction of the wide portion 62 of the reference key member 6A is unknown, the distance LP2 may be measured in the length adjustment step S3.

If the distance LP2 is greater than the distance D2 ("YES" in step S35), the another-side projecting portion 64 is cut to be shortened (cutting step S36). As shown in FIG. 8, since the another-side projecting portion 64 has its distal end portion (area to be cut CA2) removed by the cutting process in the cutting step 536, the length (distance LP4) of the another-side projecting portion 64 in the width direction after the cutting process is shorter than the length (distance LP2) in the width direction before the cutting process. The above-described distance LP4 is the distance (distance in the width direction) from the end face 612 on the another side in the width direction of the narrow portion 61 to the end face (a distal end face after the cutting process) 622A on the another side in the width direction of the wide portion 62. The distal end face 622A after the cutting process has a cut mark 624 caused by the cutting process in the cutting step S36.

The cutting step S36 may include adjusting a section (area to be cut CA2) to be cut and removed from the another-side projecting portion 64 so that the above-described distance LP4 satisfies a condition of $0.95 \times D2 \leq LP4 \leq D2$. If the distance LP2 is equal to the distance D2 or less than the distance D2 ("NO" in step S35), the length of the another-side projecting portion 64 need not be adjusted.

Each of the above-described one-side end face 621A (621) and the above-described another-side end face 622A (622) in the width direction of the wide portion 62 extends along a direction intersecting (in the illustrated example, orthogonal to) the width direction of the wide portion 62.

By actually measuring the above-described distance D1 in the first measurement step S31, it is possible to find an appropriate length of the one-side projecting portion 63 in the width direction for fitting into the wide groove portion 52. By actually measuring the above-described distance D2 in the second measurement step S32, it is possible to find an appropriate length of the another-side projecting portion 64 in the width direction for fitting into the wide groove portion 52. Since the cutting step S34, S36 includes cutting the unnecessary distal end portion (area to be cut CA1, CA2) of the one-side projecting portion 63 or the another-side projecting portion 64 according to the measurement results of the first measurement step S31 and the second measurement step S32, the length of the one-side projecting portion 63 or the another-side projecting portion 64 in the width direction can be set to an appropriate length where a gap between the end faces 521 and 522 of the wide groove portion 52 is small. Thus, it is possible to suppress from the early stage that the key member 6 fitted into the key groove 5 is thermally elongated due to the influence of heat during operation of the rotating electrical machine 2.

In some embodiments, as shown in FIG. 2, 6, 9, the above-described first groove portion 32 has the larger groove width than the above-described second groove portion 42. That is, the first groove portion 32 is the wide groove portion 52, and the second groove portion 42 is the narrow groove portion 51. In this case, by making the groove width of the first groove portion 32 which is disposed in the leg portion 3 placed on the support member 4 larger than the groove width of the second groove portion 42 disposed in the support member 4, it is possible to suppress that the leg portion 3 contacts a corner of the second groove portion 42 on the second surface 41 side and the above-described corner is damaged when the leg portion 3 is placed on the support member 4.

Figure 10:
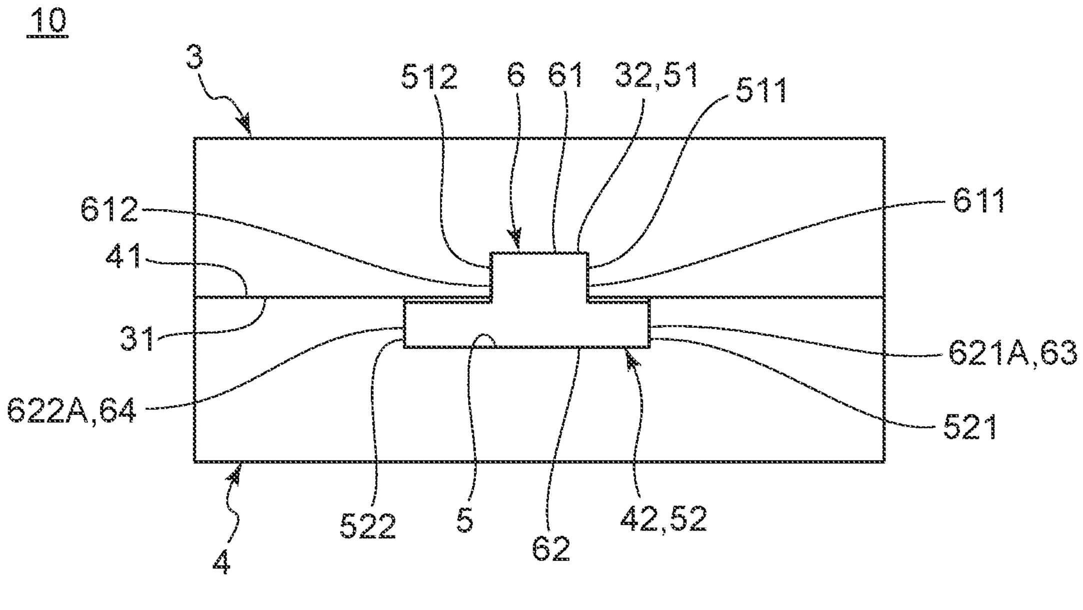
FIG. 10 is a schematic view of the installation structure for the rotating electrical machine according to an embodiment.

FIG. 10 is a schematic view of the installation structure 10 for the rotating electrical machine 2 according to an embodiment. In some embodiments, as shown in FIG. 10, the above-described first groove portion 32 may have the smaller groove width than the above-described second groove portion 42. That is, the first groove portion 32 may be the narrow groove portion 51, and the second groove portion 42 may be the wide groove portion 52.

(Installation Structure for Rotating Electrical Machine)

As shown in FIGS. 9 and 10, the installation structure 10 for the rotating electrical machine 2 according to some embodiments includes the above-described leg portion 3 which has the first surface 31 formed with the first groove portion 32, the above-described support member 4 which has the second surface 41 formed with the second groove portion 42 and on which the leg portion 3 is placed such that the above-described narrow groove portion 51 falls within the range in the width direction of the wide groove portion 52 described above, and the above-described key member 6 which includes the narrow portion 61 fitted into the narrow groove portion 51 and the wide portion 62 fitted into the wide groove portion 52. The wide portion 62 of the key member 6 has the above-described one-side projecting portion 63 and the above-described another-side projecting portion 64. The distal end face 621A, 622A of at least either of the one-side projecting portion 63 or the another-side projecting portion 64 has the cut mark 623, 624.

With the above configuration, when the leg portion 3 is placed on the support member 4, the relative position of the wide groove portion 52 to the narrow groove portion 51 may shift in the width direction of the wide groove portion 52. The length of at least either of the one-side projecting portion 63 or the another-side projecting portion 64 of the key member 6 is shortened according to the relative position of the wide groove portion 52 to the narrow groove portion 51 after the leg portion 3 is placed on the support member 4, allowing the wide portion 62 of the key member 6 to be fitted into the wide groove portion 52. When the length of at least either of the one-side projecting portion 63 or the another-side projecting portion 64 is shortened, the cut mark 623, 624 is formed on the distal end face 621A, 622A. The distal end face 621A. 622A having the cut mark 623, 624 is highly probable that the length of the one-side projecting portion 63 or the another-side projecting portion 64 is adjusted. The key member 6 can be fitted into the key groove 5, as long as the misalignment between the wide groove portion 52 and the narrow groove portion 51 can be addressed by adjusting the length of the one-side projecting portion 63 or the another-side projecting portion 64. Thus, with the above configuration, it is possible to improve the workability of the installation work in case the misalignment occurs during the installation work for the rotating electrical machine 2.

With the above configuration, since the length of the one-side projecting portion 63 or the another-side projecting portion 64 is adjusted, it is possible to reduce the gap between the wide groove portion 52 and the wide portion 62. By reducing the gap between the wide groove portion 52 and the wide portion 62, it is possible to suppress from the early stage that the key member 6 fitted into the key groove 5 is thermally elongated due to an influence of heat during operation of the rotating electrical machine 2.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "including" or "having" one constitutional element is not an exclusive expression that excludes the presence of other constitutional elements.

The present disclosure is not limited to the above-described embodiments, and also includes an embodiment obtained by modifying the above-described embodiments and an embodiment obtained by combining these embodiments as appropriate.

The contents described in some embodiments described above would be understood as follows, for instance.

1) An installation method (1) for a rotating electrical machine according to at least one embodiment of the present disclosure is an installation method (1) for a rotating electrical machine (2) that includes a rotor (21), a stator (22) disposed so as to surround the rotor (21), and a casing (23) configured to house the rotor (21) and the stator (22), including: a placement step (S1) of placing a leg portion (3), which is disposed in the casing (23) and has a first surface (31) formed with a first groove portion (32) extending along a first direction intersecting an axial direction of the rotor (21), on a support member (4), which has a second surface (41) formed with a second groove portion (42) extending along the first direction, the placement step (S1) including placing the leg portion (3) on the support member (4) such that a narrow groove portion (51) having a smaller groove width of the first groove portion (32) or the second groove portion (42) falls within a range in a width direction of a wide groove portion (52) having a larger groove width of the first groove portion (32) or the second groove portion (42); a preparation step (S2) of preparing a key member (6) which includes a narrow portion (61) to be fitted into the narrow groove portion (51), and a wide portion (62) having a one-side projecting portion (63) projecting to one side in the width direction from the narrow portion (61) and an another-side projecting portion (64) projecting to another side in the width direction from the narrow portion (61); a length adjustment step (S3) of shortening at least either of the one-side projecting portion (63) or the another-side projecting portion (64) of the key member (6) to be fitted into the wide groove portion (52), after the placement step (S1); and a fitting step (S4) of fitting the key member (6) into a key groove (5) formed by the first groove portion (32) and the second groove portion (42), after the length adjustment step (S3).

With the above method 1), when the leg portion (3) is placed on the support member (4), the relative position of the wide groove portion (52) to the narrow groove portion (51) may shift in the width direction of the wide groove portion (52). The length of at least either of the one-side projecting portion (63) or the another-side projecting portion (64) of the key member (6) is shortened according to the relative position of the wide groove portion (52) to the narrow groove portion (51) after the leg portion (3) is placed on the support member (4), allowing the wide portion (62) of the key member (6) to be fitted into the wide groove portion (52). With the above method 1), the key member (6)

can be fitted into the key groove (5), as long as the misalignment between the wide groove portion (52) and the narrow groove portion (51) can be addressed in the length adjustment step (S3). Thus, with the above method 1), it is possible to improve the workability of the installation work in case the misalignment occurs during the installation work for the rotating electrical machine (2).

Further, with the above method 1), since the length of the one-side projecting portion (63) or the another-side projecting portion (64) is adjusted in the length adjustment step (S3), it is possible to reduce a gap between the wide groove portion (52) and the wide portion (62). By reducing the gap between the wide groove portion (52) and the wide portion (62), it is possible to suppress from an early stage that the key member (6) fitted into the key groove (5) is thermally elongated due to an influence of heat during operation of the rotating electrical machine (2).

2) In some embodiments, in the installation method (1) for the rotating electrical machine as defined in the above 1), a length LW1 of the wide portion (62) satisfies a condition of 0.95×LW≤LW1≤LW, where a length of the wide groove portion (52) in the width direction is defined as LW and a length of the wide portion (62) in the width direction after the length adjustment step (S3) is defined as LW1.

With the above method 2), if the length LW1 of the wide portion (62) satisfies the above-described condition, the gap between the wide groove portion (52) and the wide portion (62) when the wide portion (62) is fitted in the wide groove portion (52) becomes small. Thus, it is possible to suppress from the early stage that the key member (6) fitted into the key groove (5) is thermally elongated due to the influence of heat during operation of the rotating electrical machine (2).

3) In some embodiments, in the installation method (1) for the rotating electrical machine as defined in the above 1) or the above 2), a length LN1 of the narrow portion (61) satisfies a condition of 0.95×LN≤LN1≤LN, where a length of the narrow groove portion (51) in the width direction is defined as LN and a length of the narrow portion (61) of the key member (6), which is prepared in the preparation step (S2), in the width direction is defined as LN1.

With the above method 3), if the length LN1 of the narrow portion (61) satisfies the above-described condition, the narrow portion (61) can be fitted in the narrow groove portion (51) without additional work on the key groove (5) or the key member (6) after the preparation step (S2). Further, with the above method 3), if the length LN1 of the narrow portion (61) satisfies the above-described condition, a gap between the narrow groove portion (51) and the narrow portion (61) when the narrow portion (61) is fitted in the narrow groove portion (51) becomes small. Thus, it is possible to suppress from the early stage that the key member (6) fitted into the key groove (5) is thermally elongated due to the influence of heat during operation of the rotating electrical machine (2).

4) In some embodiments, in the installation method (1) for the rotating electrical machine as defined in any one of the above 1) to the above 3), the first groove portion (32) has the larger groove width than the second groove portion (42).

With the above method 4), by making the groove width of the first groove portion (32) which is disposed in the leg portion (3) placed on the support member (4) larger than the groove width of the second groove portion (42) disposed in the support member (4), it is possible to suppress that the leg portion (3) contacts a corner of the second groove portion (42) on the second surface (41) side and the above-described corner is damaged when the leg portion (3) is placed on the support member (4).

5) In some embodiments, in the installation method (1) for the rotating electrical machine as defined in any one of the above 1) to the above 4), the length adjustment step (S3) includes: a first measurement step (S31) of measuring a distance (D1) from an end face (521) on the one side in the width direction of the wide groove portion (52) to an end face (511) on the one side in the width direction of the narrow groove portion (51) in the key groove (5); a second measurement step (S32) of measuring a distance (D2) from an end face (522) on the another side in the width direction of the wide groove portion (52) to an end face (512) on the another side in the width direction of the narrow groove portion (51) in the key groove (5); and a cutting step (S34, S36) of cutting at least either of the one-side projecting portion (63) or the another-side projecting portion (64) of the key member (6) to be shortened according to measurement results of the first measurement step (S31) and the second measurement step (S32).

With the above method 5), by actually measuring the above-described distance (D1) in the first measurement step (S31), it is possible to find an appropriate length of the one-side projecting portion (63) in the width direction for fitting into the wide groove portion (52). By actually measuring the above-described distance (D2) in the second measurement step (S32), it is possible to find an appropriate length of the another-side projecting portion (64) in the width direction for fitting into the wide groove portion (52). Since the cutting step (S34, S36) includes cutting the unnecessary distal end portion of the one-side projecting portion (63) or the another-side projecting portion (64) according to the measurement results of the first measurement step (S31) and the second measurement step (S32), the length of the one-side projecting portion (63) or the another-side projecting portion (64) in the width direction can be set to an appropriate length where a gap between the end faces (521, 522) of the wide groove portion (52) is small. Thus, it is possible to suppress from the early stage that the key member (6) fitted into the key groove (5) is thermally elongated due to the influence of heat during operation of the rotating electrical machine (2).

6) An installation structure (10) for a rotating electrical machine according to at least one embodiment of the present disclosure is an installation structure (10) for a rotating electrical machine (2) that includes a rotor (21), a stator (22) disposed so as to surround the rotor (21), and a casing (23) configured to house the rotor (21) and the stator (22), including: a leg portion (3) which is disposed in the casing (23) and has a first surface (31) formed with a first groove portion (32) extending along a first direction intersecting an axial direction of the rotor (21); a support member (4) which has a second surface (41) formed with a second groove portion (42) extending along the first direction, the support member (4) including the leg portion (3) placed thereon such that a narrow groove portion (51) having a smaller groove width of the first groove portion (32) or the second groove portion (42) falls within a range in a width direction of a wide groove portion (52) having a larger groove width of the first groove portion (32) or the second groove portion (42); and a key member (6) which includes a narrow portion (61) fitted into the narrow groove portion (51) and a wide portion (62) fitted into the wide groove portion (52). The wide portion (62) of the key member (6) has a one-side projecting portion (63) projecting to one side in the width direction from the narrow portion (61) and an another-side projecting portion (64) projecting to another side in the width direction from the narrow portion (61). At least either of the one-side projecting portion (63) or the another-side projecting portion (64) has a cut mark (623, 624) on a distal end face (621A, 622A).

With the above configuration 6), when the leg portion (3) is placed on the support member (4), the relative position of the wide groove portion (52) to the narrow groove portion (51) may shift in the width direction of the wide groove portion (52). The length of at least either of the one-side projecting portion (63) or the another-side projecting portion (64) of the key member (6) is shortened according to the relative position of the wide groove portion (52) to the narrow groove portion (51) after the leg portion (3) is placed on the support member (4), allowing the wide portion (62) of the key member (6) to be fitted into the wide groove portion (52). When the length of at least either of the one-side projecting portion (63) or the another-side projecting portion (64) is shortened, the cut mark (623, 624) is formed on the distal end face (621A, 622A). With the above configuration 6), the distal end face (621A, 622A) having the cut mark (623, 624) is highly probable that the length of the one-side projecting portion (63) or the another-side projecting portion (64) is adjusted. The key member (6) can be fitted into the key groove (5), as long as the misalignment between the wide groove portion (52) and the narrow groove portion (51) can be addressed by adjusting the length of the one-side projecting portion (63) or the another-side projecting portion (64). Thus, with the above configuration 6), it is possible to improve the workability of the installation work in case the misalignment occurs during the installation work for the rotating electrical machine (2).

With the above configuration 6), since the length of the one-side projecting portion (63) or the another-side projecting portion (64) is adjusted, it is possible to reduce the gap between the wide groove portion (52) and the wide portion (62). By reducing the gap between the wide groove portion (52) and the wide portion (62), it is possible to suppress from the early stage that the key member (6) fitted into the key groove (5) is thermally elongated due to the influence of heat during operation of the rotating electrical machine (2).

The invention claimed is:

1. An installation method for a rotating electrical machine that includes a rotor, a stator disposed so as to surround the rotor, and a casing configured to house the rotor and the stator, the method comprising:

a placement step of placing a leg portion, which is disposed in the casing and has a first surface having a longitudinal direction along an axial direction of the rotor formed with a first groove portion extending along a first direction intersecting the axial direction of the rotor, on a support member, which has a second surface having a longitudinal direction along the axial direction of the rotor formed with a second groove portion extending along the first direction, the placement step including placing the leg portion on the support member such that a narrow groove portion having a smaller groove width of the first groove portion or the second groove portion falls within a range in a width direction of a wide groove portion having a larger groove width of the first groove portion or the second groove portion;

a preparation step of preparing a key member which includes a narrow portion to be fitted into the narrow groove portion, and a wide portion having a one-side projecting portion projecting to one side in the width direction from the narrow portion and an another-side projecting portion projecting to another side in the width direction from the narrow portion;

a length adjustment step of shortening at least either of the one-side projecting portion or the another-side projecting portion of the key member to be fitted into the wide groove portion, after the placement step; and a fitting step of fitting the key member into a key groove formed by the first groove portion and the second groove portion, after the length adjustment step.

2. The installation method for the rotating electrical machine according to claim 1, wherein a length LW1 of the wide portion satisfies a condition of 0.95×LW≤LW1≤LW, where a length of the wide groove portion in the width direction is defined as LW and a length of the wide portion in the width direction after the length adjustment step is defined as LW1.

3. The installation method for the rotating electrical machine according to claim 1, wherein a length LN1 of the narrow portion satisfies a condition of 0.95×LN≤LN1≤LN1, where a length of the narrow groove portion in the width direction is defined as LN and a length of the narrow portion of the key member, which is prepared in the preparation step, in the width direction is defined as LN1.

4. The installation method for the rotating electrical machine according to claim 1, wherein the first groove portion has the larger groove width than the second groove portion.

5. The installation method for the rotating electrical machine according to claim 1, wherein the length adjustment step includes:

a first measurement step of measuring a distance from an end face on the one side in the width direction of the wide groove portion to an end face on the one side in the width direction of the narrow groove portion in the key groove;

a second measurement step of measuring a distance from an end face on the another side in the width direction of the wide groove portion to an end face on the another side in the width direction of the narrow groove portion in the key groove; and a cutting step of cutting at least either of the one-side projecting portion or the another-side projecting portion of the key member to be shortened according to measurement results of the first measurement step and the second measurement step.

6. An installation method for a rotating electrical machine that includes a rotor, a stator disposed so as to surround the rotor, and a casing configured to house the rotor and the stator, the method comprising:

a placement step of placing a leg portion, which is disposed in the casing and has a first surface formed with a first groove portion extending along a first direction intersecting an axial direction of the rotor, on a support member, which has a second surface formed with a second groove portion extending along the first direction, the placement step including placing the leg portion on the support member such that a narrow groove portion having a smaller groove width of the first groove portion or the second groove portion falls within a range in a width direction of a wide groove portion having a larger groove width of the first groove portion or the second groove portion;

a preparation step of preparing a key member which includes a narrow portion to be fitted into the narrow groove portion, and a wide portion having a one-side projecting portion projecting to one side in the width direction from the narrow portion and an another-side projecting portion projecting to another side in the width direction from the narrow portion;

a length adjustment step of shortening at least either of the one-side projecting portion or the another-side projecting portion of the key member to be fitted into the wide groove portion, after the placement step; and a fitting step of fitting the key member into a key groove formed by the first groove portion and the second groove portion, after the length adjustment step, wherein the length adjustment step includes:

a first measurement step of measuring a distance from an end face on the one side in the width direction of the wide groove portion to an end face on the one side in the width direction of the narrow groove portion in the key groove;

a second measurement step of measuring a distance from an end face on the another side in the width direction of the wide groove portion to an end face on the another side in the width direction of the narrow groove portion in the key groove; and a cutting step of cutting at least either of the one-side projecting portion or the another-side projecting portion of the key member to be shortened according to measurement results of the first measurement step and the second measurement step.

* * * * *